(12) United States Patent
Kohavi et al.

(10) Patent No.: US 11,431,403 B2
(45) Date of Patent: Aug. 30, 2022

(54) RADIO FREQUENCY REPEATER CIRCUITRY

(71) Applicant: Intel Corporation, Santa Clara, CA (US)

(72) Inventors: Barak Kohavi, Haifa (IL); Amit Freiman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 16/988,724

(22) Filed: Aug. 10, 2020

(65) Prior Publication Data

US 2021/0126702 A1   Apr. 29, 2021

(30) Foreign Application Priority Data

Oct. 2, 2019   (EP) .................................... 19200971

(51) Int. Cl.
*H04B 7/155* (2006.01)
(52) U.S. Cl.
CPC ................ *H04B 7/15535* (2013.01)
(58) Field of Classification Search
CPC .................................................. H04B 7/15535
See application file for complete search history.

(56) References Cited

U.S. PATENT DOCUMENTS

| 9,161,330 B2 | 10/2015 | Homchaudhuri et al. |
| 2006/0052066 A1 | 3/2006 | Cleveland et al. |
| 2007/0268846 A1* | 11/2007 | Proctor .............. H04B 7/15535 370/279 |
| 2020/0145094 A1* | 5/2020 | Huang .............. H04B 7/15535 |

FOREIGN PATENT DOCUMENTS

| CN | 202617123 U | 12/2012 |
| KR | 20050087611 A | 8/2005 |
| WO | 2014158781 A1 | 10/2014 |
| WO | 2019014254 A2 | 1/2019 |

OTHER PUBLICATIONS

European Search Report issued for the European patent application No. 19 20 0971, dated Feb. 20, 2020, 1 page (for informational purposes only).

* cited by examiner

*Primary Examiner* — Hsinchun Liao
(74) *Attorney, Agent, or Firm* — Viering, Jentschura & Partner mbB

(57) ABSTRACT

The disclosure relates to a radio frequency (RF) repeater circuitry, including: a single transceiver including a receiver for receiving a radio signal from at least one User Equipment, UE, or from a base station, and a transmitter for transmitting a radio signal to the at least one UE or to the base station; and a decision logic configured to: set the receiver to receive a radio signal from the at least one UE and set the transmitter to transmit a radio signal to the base station upon detecting a radio signal reception from the at least one UE, and set the receiver to receive a radio signal from the base station and set the transmitter to transmit a radio signal to the at least one UE upon detecting a radio signal reception from the base station.

15 Claims, 5 Drawing Sheets

RADIO FREQUENCY REPEATER CIRCUITRY

CROSS-REFERENCE TO RELATED APPLICATIONS

This application claims priority to European Application 19 200 971 filed on Oct. 2, 2019, which is herein incorporated by reference in its entirety.

TECHNICAL FIELD

The disclosure relates to a radio frequency (RF) repeater circuitry for an RF repeater, in particular a low cost 5G mmWave RF repeater, including a single transceiver with receiver and transmitter, and a decision logic for appropriately setting the transceiver. The disclosure further relates to an RF repeater, a decision logic for an RF repeater circuitry and a method for repeating signals by an RF repeater.

BACKGROUND

An RF repeater for 5G mmW may be a device positioned between a cellular base station (gNB) and cellular clients (UE) in order to amplify the signal transmitted from the gNB to the UEs as well as signals transmitted from the UEs to the gNB, thereby allowing to improve the link budget and cell coverage area. The 5G mmW standard may be based on a TDD protocol (time domain duplex) such that the gNB may either transmit (TX) to the UE or receive (RX) from the UE, but not both at the same time, implying that a repeater should activate a single RX to TX chain at any given time (either from UE to gNB or from gNB to UE). However, the mmW 5G repeater may be purely RF based, without demodulation and data translation capabilities, and thus has no prior knowledge of the transmit (TX) to receive (RX) cycles and therefore must be implemented with two RX to TX chains working simultaneously (one set to RX from gNB and TX to UE and the other set to RX from UE and TX to gNB).

In such a solution, costs may be significantly high due to the implementation of two independent RX to TX chains. Leakage from one chain to the other can cause instability and oscillations, requiring better HW isolations eventually increasing the cost even more. In this disclosure, solutions for a low-cost RF repeater, and, in particular, an RF repeater for 5G mmW are presented.

BRIEF DESCRIPTION OF THE DRAWINGS

The accompanying drawings are included to provide a further understanding of various aspects. The drawings illustrate aspects and together with the description serve to explain principles of aspects. Other aspects and many of the intended advantages of aspects will be readily appreciated as they become better understood by reference to the following detailed description.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the concept of the present disclosure. The following detailed description, therefore, is not to be taken in a limiting sense, and the concept of the present disclosure is defined by the appended claims.

The following terms, abbreviations and notations will be used herein:
5G: 3GPP fifth generation specifications
mmW: millimeter waves
UE: User Equipment, cellular client
gNB: base station in 5G notation, cellular base station
LTE: Long Term Evolution
RF: Radio Frequency
RX: Receiving
TX: Transmitting
TDD: Time domain duplex
TRX: Transceiver, device with transmitter and receiver
OFDM: Orthogonal Frequency Division Multiplex Comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as 5G new radio (NR), in particular for millimeter-wave data rate. The techniques may also be applied in LTE networks, in particular LTE-A and/or OFDM and successor standards. The methods are also applicable for high speed communication standards from the 802.11 family according to the WiFi alliance, e.g. 802.11ad, 802.11ac, 802.11ax and successor standards.

The methods and devices described below may be implemented in electronic devices which may be positioned between a base station such as gNB and one or more clients (UEs) in order to amplify and/or forward the signals transmitted from the gNB to the UEs as well as signals transmitted from the UEs to the gNB. The described devices may include integrated circuits (ICs) and/or passives and may be manufactured according to various technologies. For example, the circuits may be designed as logic integrated circuits, ASICs, analog integrated circuits, mixed signal integrated circuits, optical circuits, memory circuits and/or integrated passives.

Figure 1:
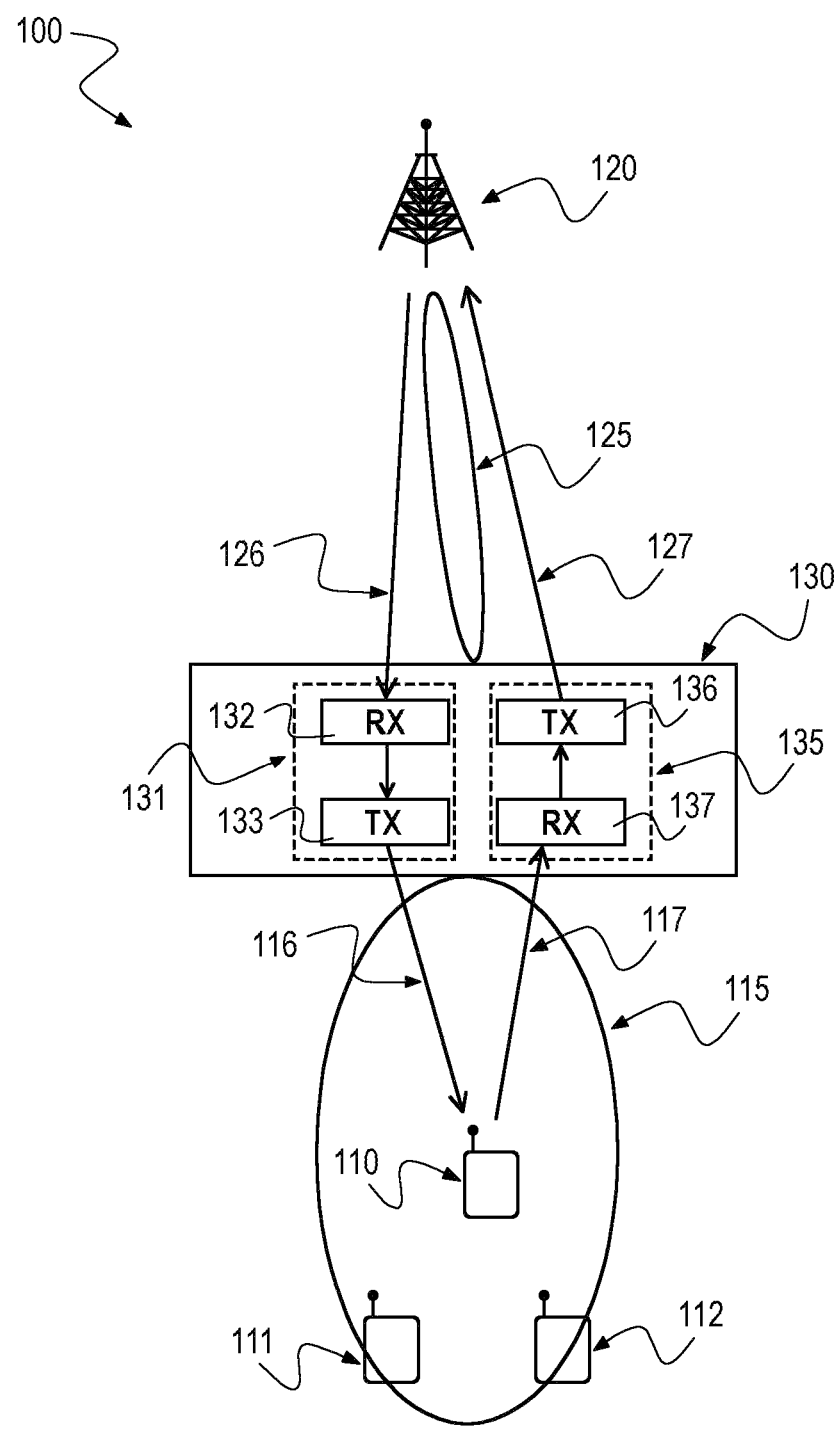
FIG. 1 is a schematic diagram illustrating an RF repeater 100 for 5G mmW.

FIG. 1 is a schematic diagram illustrating a 5G mmW communication system 100 including an RF repeater 130.

The RF repeater 130 for 5G mmW is a device which may be positioned between a cellular base station (gNB) 120 and cellular clients (UE) 110, 111, 112 in order to amplify the signal 126 transmitted from the gNB 120 to the UEs 110, 111, 112 as well as signals 117 transmitted from the UEs 110, 111, 112 to the gNB 120, thereby allowing to improve the link budget and cell coverage area. The 5G mmW standard may be based on TDD protocol such that the gNB 120 is either transmitting (TX) 126 to the UE 110 or receiving (RX) 127 from the UE 110 but not both at the same time, implying that a repeater 130 should activate a single RX to TX chain 131, 135 at any given time (either a first RX-TX chain 135 from UE to gNB or a second RX-TX chain 131 from gNB to UE). However, the mmW 5G repeater 130 may be purely RF based, without demodulation and data translation capabilities, thus has no prior knowledge of the transmit (TX) to receive (RX) cycles and therefore may need to be implemented with two RX to TX chains 131, 135 working simultaneously.

In the first RX-TX chain 135, the receiver RX 137 may be set for receiving the signals 117 from the UE 110 and the transmitter TX 136 may be set for transmitting the signals 127 to the gNB 120. In the second RX-TX chain 131, the receiver RX 132 may be set for receiving the signals 126 from gNB 120 and the transmitter 133 may be set for transmitting the signals 116 to the UE 110.

Figure 2:
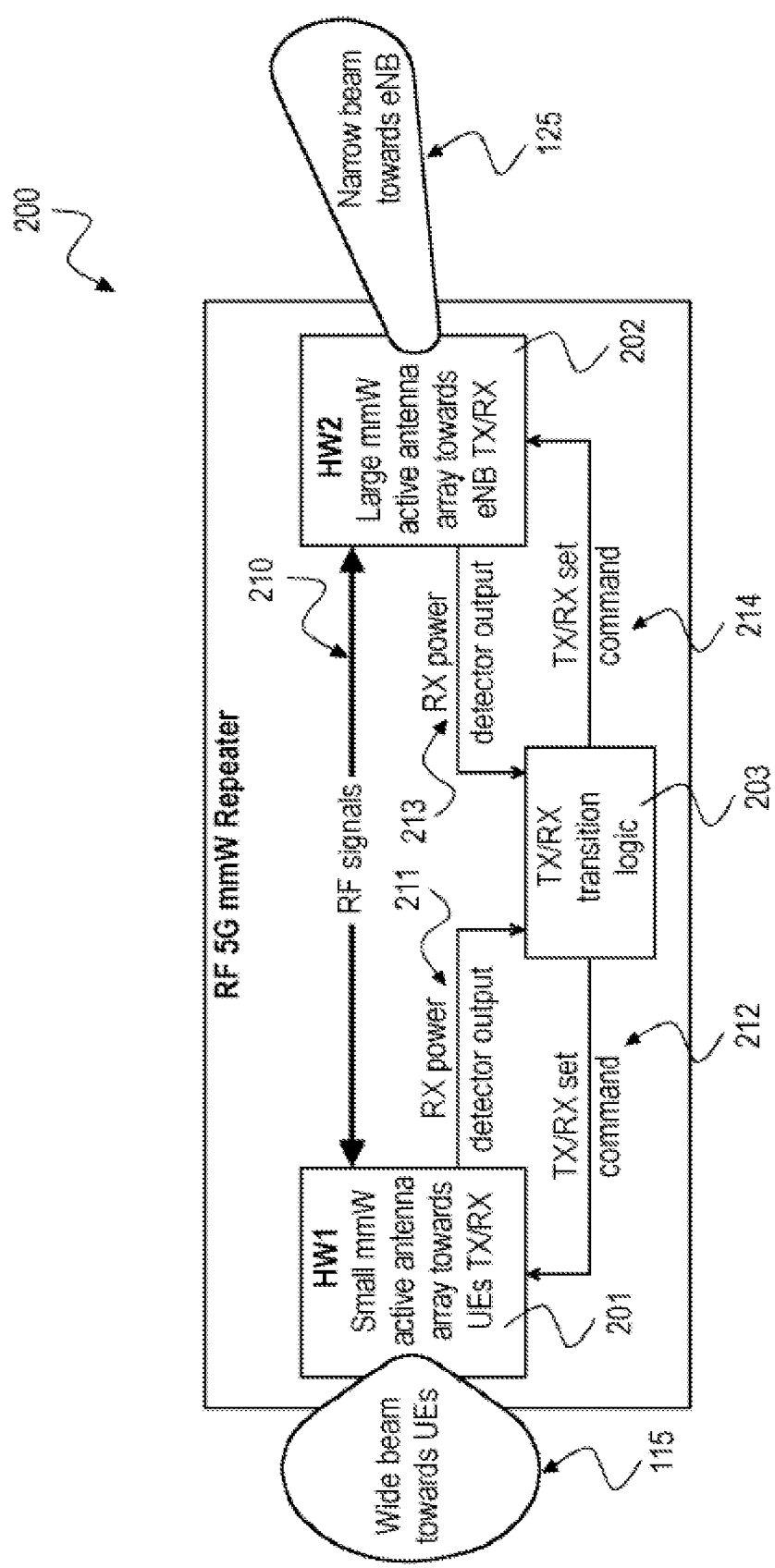
FIG. 2 is a block diagram illustrating an exemplary RF repeater 200 according to the disclosure.

FIG. 2 is a block diagram illustrating an exemplary RF repeater 200 according to the disclosure.

The repeater 200 may be implemented with a single RX to TX chain 201, 202 by sensing the RF medium via RF detectors and determining when the system should be set in RX from gNB and TX to UE and when it should be set to RX from UE and TX to gNB. The 5G mmW RF Repeater may be built of two independent hardware blocks HW1, 201, HW2, 202 implementing either receiver or transmitter, connected back to back to create a single RX to TX chain 201, 202, i.e. a single transceiver, as shown in FIG. 2.

HW1 201 may be connected to an antenna array which is facing the UEs and HW2 202 may be connected to an antenna array which is facing the gNB. HW1 201 may form a wide beam 115 towards the UE, and HW2 202 may form a narrow beam towards the gNB.

There may be four possible states for the HW1 and HW2 and their corresponding functionality: In a first state, HW1 may be in RX implementing receiver and HW2 may be in TX implementing transmitter. The first state may be also referred to as the UEs 4 gNB state providing signal enhancement from UEs towards gNB. In a second state, HW2 may be in RX implementing receiver and HW1 may be in TX implementing transmitter. The second state may be also referred to as the gNB 4 UEs state providing signal enhancement from gNB towards UEs. In a third state, HW1 may be in RX and HW2 may be in RX. The third state may be also referred to as the dual sensing state where the wireless media may be sensed on both ends. A fourth state, where HW1 may be in TX and HW2 may be in TX is not used.

According to some aspects, an RF repeater is provided that includes a single transceiver, i.e., one receiver and one transmitter, instead of two transceivers, i.e., two receivers and two transmitters. The idea can be seen as to determine if either the gNB or the UEs are transmitting by sensing the wireless media. Sensing may be accomplished via two or more independent peak power detectors, allowing to sense and distinguish between a signal passing through the repeater 200 rather than just amplified noise. Detectors can be placed in various positions such as on the receiving or transmitting ends of each hardware block 201, 202 towards the antennas or in between the hardware blocks 201, 202. The reason for having at least two independent detectors can be seen in that at least one detector should be able to sense if a signal is transmitted from the UE side (RX power detector output 211) while simultaneously a different detector should be able to sense if a signal is transmitted from the gNB (RX power detector output 213). The decision logic for which states to set 212, 214 for HW1 and HW2 (either TX/RX, RX/TX or RX/RX) is accomplished based on the peak power detectors outputs 211, 213 as described in FIG. 3.

The RF repeater 200 as shown in FIG. 2 may include a single transceiver, HW1, 201, HW2, 202 with a receiver for receiving a radio signal from at least one User Equipment, UE (e.g. HW1 implemented as receiver) or from a base station (e.g. HW2 implemented as receiver), and a transmitter for transmitting a radio signal to the at least one UE (e.g. HW1 implemented as transmitter) or to the base station (e.g. HW2 implemented as transmitter). The RF repeater 200 may include at least two power detectors (not shown in FIG. 2), wherein a first power detector is configured to detect a radio signal reception from the at least one UE; and a second power detector is configured to detect a radio signal reception from the base station.

The RF repeater 200 may further include a decision logic 203, as described in more detail below with respect to FIG. 3. The decision logic 203 may be configured to: set the receiver to receive a radio signal from the at least one UE and set the transmitter to transmit a radio signal to the base station upon detecting a radio signal reception from the at least one UE, and set the receiver to receive a radio signal from the base station and set the transmitter to transmit a radio signal to the at least one UE upon detecting a radio signal reception from the base station.

In an exemplary implementation, the RF repeater 200 may include a first antenna port of a first antenna array, e.g. a first antenna array forming the wide beam 115 towards the UEs, wherein the first antenna port may be connected to the HW1 201; and a second antenna port of a second antenna array, e.g. a second antenna array forming the narrow beam 125 towards the gNB, wherein the second antenna port may be connected to the HW2 202.

In an exemplary implementation of the RF repeater 200, the decision logic may be configured to: set the transceiver in a first mode for receiving a radio signal from the at least one UE and for transmitting a radio signal to the base station upon detecting a radio signal reception from the at least one UE, and set the transceiver in a second mode for receiving a radio signal from the base station and for transmitting a radio signal to the at least one UE upon detecting a radio signal reception from the base station.

In an exemplary implementation of the RF repeater 200, the first power detector may be connected between the receiver and the first antenna port of the first antenna array or between the receiver and the transmitter; and the second power detector may be connected between the receiver and the second antenna port of the second antenna array or between the receiver and the transmitter.

In an exemplary implementation, the RF repeater 200 may include: a third power detector configured to detect a radio signal reception from the at least one UE; and a fourth power detector configured to detect a radio signal reception from the base station, wherein the first power detector and the third power detector may be arranged at different positions towards the transceiver 201, 202, and wherein the second power detector and the fourth power detector may be arranged at different positions towards the transceiver 201, 202.

In an exemplary implementation of the RF repeater 200, the first power detector and the third power detector may be configured to provide a joint detection result for a radio signal reception from the at least one UE; and the second power detector and the fourth power detector may be configured to provide a joint detection result for a radio signal reception from the base station.

In an exemplary implementation of the RF repeater 200, the first power detector and the second power detector may be configured to operate independently from each other. In an exemplary implementation of the RF repeater 200, the first power detector may be configured to detect a radio signal reception from the at least one UE simultaneously with the second power detector detecting a radio signal reception from the base station.

In an exemplary implementation, the RF repeater 200 may be configured to: forward a radio signal received by the receiver in a non-demodulated state to the transmitter upon detecting a radio signal reception from the at least one UE, and forward a radio signal received by the receiver in a non-demodulated state to the transmitter upon detecting a radio signal reception from the base station.

In an exemplary implementation of the RF repeater 200, the decision logic 203 may be configured to set the transceiver 201, 202 to a dual sensing state upon detecting no radio signal reception from the at least one UE by the first power detector and upon detecting no radio signal reception from the base station by the second power detector, e.g. as shown below with respect to FIG. 3.

In an exemplary implementation of the RF repeater 200, the decision logic may be configured to operate in a first state in which the receiver is set to receive a radio signal from the base station and the transmitter is set to transmit a radio signal to the at least one UE, when a power of a radio signal detected by the first power detector is below a first detection threshold and a power of a radio signal detected by the second power detector is above a second detection threshold, e.g. as shown below with respect to FIG. 3.

In an exemplary implementation of the RF repeater 200, the decision logic 203 may be configured to operate in a second state in which the receiver is set to receive a radio signal from the at least one UE and the transmitter is set to transmit a radio signal to the base station, when a power of a radio signal detected by the first power detector is above a third detection threshold and a power of a radio signal detected by the second power detector is below a fourth detection threshold, e.g. as shown below with respect to FIG. 3.

In an exemplary implementation of the RF repeater 200, the decision logic 203 may be configured to operate in a third state in which the transceiver 201, 202 is set to a dual sensing state, when: in the first state of the decision logic a power of a radio signal detected by the second power detector is below a fifth detection threshold; or in the second state of the decision logic a power of a radio signal detected by the first power detector is below a sixth detection threshold, e.g. as shown below with respect to FIG. 3.

In an exemplary implementation, the RF repeater 200 may be configured to perform the detecting of a radio signal and a transition between the states of the decision logic within a guard period or cyclic prefix of the radio signal, e.g. as shown below with respect to FIG. 4.

In an exemplary implementation of the RF repeater 200, the decision logic 203 may include a hard wire trigger configured to initiate the transition between the states of the decision logic.

In an exemplary implementation of the RF repeater 200, the decision logic 203 may include one or more registers configured to process the transition between the states of the decision logic 203; and the decision logic 203 may be configured to secure the one or more registers before performing the transition.

In an exemplary implementation of the RF repeater 200, the RF repeater 200 may be configured to repeat 5G mm Wave radio signals.

The RF repeater 200 may include an RF repeater circuitry including the functional entities 201, 202 and 203 as shown in FIG. 2.

Such an RF repeater circuitry may include a single transceiver including a receiver for receiving a radio signal from at least one User Equipment, UE, or from a base station, and a transmitter for transmitting a radio signal to the at least one UE or to the base station; and a decision logic 203 configured to: set the receiver to receive a radio signal from the at least one UE and set the transmitter to transmit a radio signal to the base station upon detecting a radio signal reception from the at least one UE, and set the receiver to receive a radio signal from the base station and set the transmitter to transmit a radio signal to the at least one UE upon detecting a radio signal reception from the base station.

In an exemplary implementation of the RF repeater circuitry, the receiver may be connected to an antenna port of a first antenna array and the transmitter may be connected to an antenna port of a second antenna array; or the receiver may be connected to the antenna port of the second antenna array and the transmitter may be connected to the antenna port of the first antenna array.

In an exemplary implementation, the RF repeater circuitry may include a first power detector configured to detect a radio signal received from the at least one UE; and a second power detector configured to detect a radio signal received from the base station.

In an exemplary implementation of the RF repeater circuitry, the decision logic may be configured to: set the transceiver in a first mode for receiving a radio signal from the at least one UE and for transmitting a radio signal to the base station upon detecting a radio signal reception from the at least one UE, and set the transceiver in a second mode for receiving a radio signal from the base station and for transmitting a radio signal to the at least one UE upon detecting a radio signal reception from the base.

In an exemplary implementation of the RF repeater circuitry, the first power detector may be connected between the receiver and the antenna port of the first antenna array or between the receiver and the transmitter; and the second power detector may be connected between the receiver and the antenna port of the second antenna array or between the receiver and the transmitter.

In an exemplary implementation of the RF repeater circuitry, the first power detector and the second power detector may be configured to operate independently from each other. In an exemplary implementation of the RF repeater circuitry, the first power detector may be configured to detect a radio signal reception from the at least one UE simultaneously with the second power detector detecting a radio signal reception from the base station.

In an exemplary implementation, the RF repeater circuitry may be configured to: forward a radio signal received by the receiver in a non-demodulated state to the transmitter upon detecting a radio signal reception from the at least one UE, and forward a radio signal received by the receiver in a non-demodulated state to the transmitter upon detecting a radio signal reception from the base station.

In an exemplary implementation of the RF repeater circuitry, the decision logic 203 may be configured to set the transceiver 201, 202 in a dual sending state upon detecting no radio signal reception from the at least one UE and no radio signal reception from the base station.

In an exemplary implementation of the RF repeater circuitry, the decision logic 203 may be configured to operate in a first state in which the receiver is set to receive a radio signal from the base station and the transmitter is set to transmit a radio signal to the at least one UE, when a power of a radio signal detected by the first power detector is below a first detection threshold and a power of a radio signal detected sensed by the second power detector is above a second detection threshold, e.g., as shown below with respect to FIG. 3.

In an exemplary implementation of the RF repeater circuitry, the decision logic 203 may be configured to operate in a second state in which the receiver is set to receive a radio signal from the at least one UE and the transmitter is set to transmit a radio signal to the base station, when a power of a radio signal detected by the first power detector is above a third detection threshold and a power of a radio signal detected by the second power detector is below a fourth detection threshold, e.g., as shown below with respect to FIG. 3.

In an exemplary implementation of the RF repeater circuitry, the decision logic 203 may be configured to operate in a third state in which the transceiver 201, 202 is set to a dual sensing state, when: in the first state of the decision logic a power of a radio signal detected by the second power detector is below a fifth detection threshold; or in the second state of the decision logic a power of a radio signal detected by the first power detector is below a sixth detection threshold, e.g., as shown below with respect to FIG. 3.

In an exemplary implementation, the RF repeater circuitry may be configured to perform the detecting of a radio signal and a transition between the states of the decision logic within a guard period or cyclic prefix of the radio signal, e.g., as shown below with respect to FIG. 4.

In an exemplary implementation of the RF repeater circuitry, the decision logic 203 may include a hard wire trigger configured to initiate the transition between the states of the decision logic. In an exemplary implementation of the RF repeater circuitry, the decision logic 203 may include one or more registers configured to process the transition between the states of the decision logic; and the decision logic 203 may be configured to secure the one or more registers before performing the transition.

By implementing such a repeater 200 as described in this disclosure, adding a second RX to TX chain can be avoided, thereby reducing the cost. Besides, such a repeater can avoid adding a down convertor and a modem to demodulate and extract the gNB RX to TX transition timing, thereby resulting in a solution with significantly lower cost and a less complex system implementation.

Figure 3:
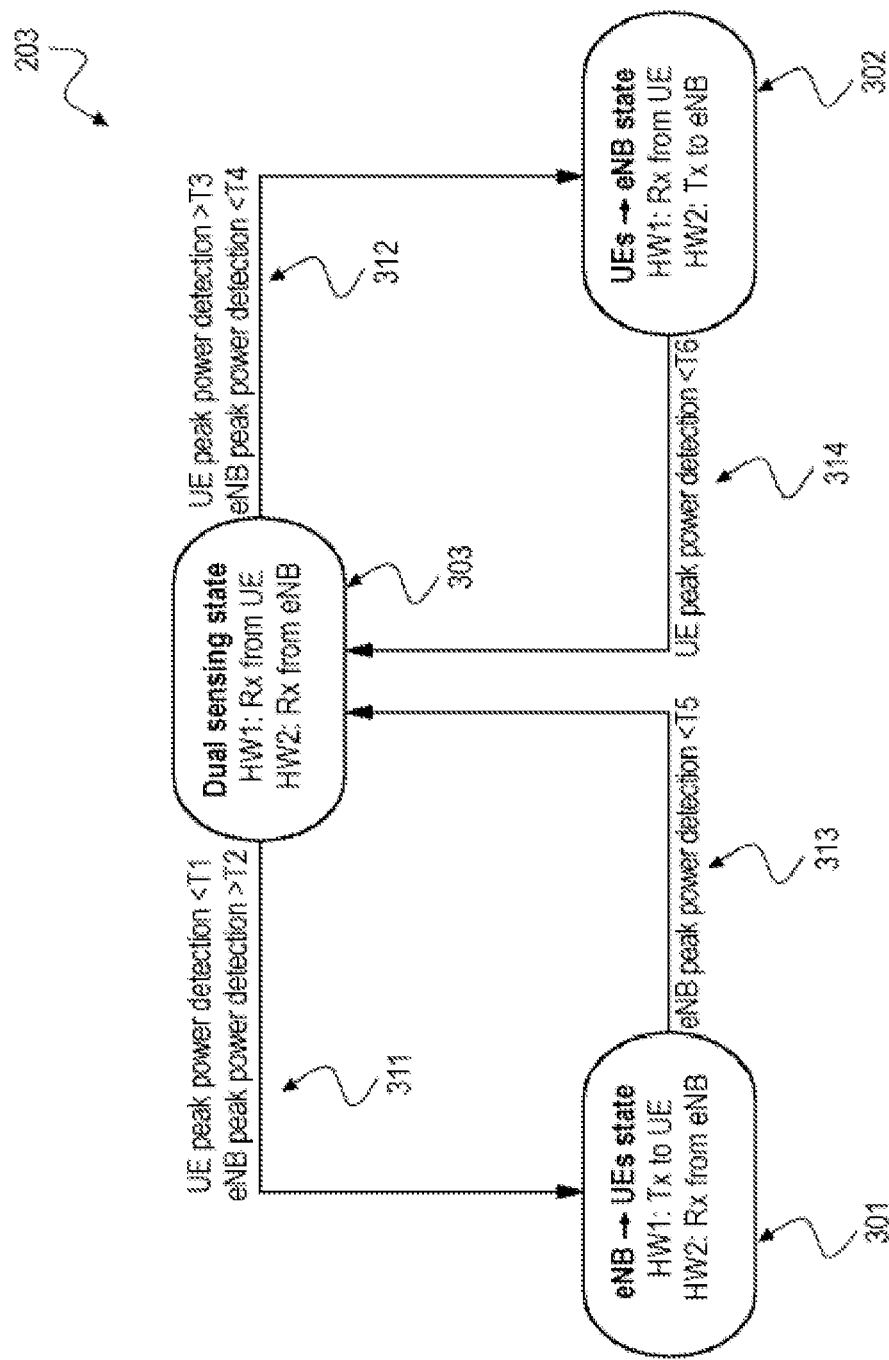
FIG. 3 is a schematic diagram illustrating an exemplary decision logic 203 of an RF repeater 200 according to the disclosure.

FIG. 3 is a schematic diagram illustrating an exemplary decision logic 203 of an RF repeater 200 according to the disclosure. The decision logic 203 may include three states 301, 302, 303 and four transitions 311, 312, 313, 314 between these states. The decision logic 203 may correspond to the decision logic 203 described above with respect to FIG. 2.

The decision logic 203 for which states to set for HW1 and HW2 (either TX/RX, RX/TX or RX/RX) may be accomplished based on the peak power detectors outputs which trigger the four transitions 311, 312, 313, 314 as shown in FIG. 3.

Two peak power detectors may be utilized in this exemplary implementation, one for UEs side and one for gNB side. Consequently, each detector may be associated with the corresponding hardware block 201, 202 (either HW1 belonging to UE or HW2 belonging to gNB). T1, T2, ..., T6 are detection thresholds which can be defined based on RF level planning calculations and later on refined via measurements.

Since the transition between states may occur after sensing the gNB and UE activity (or inactivity), it may need to be accomplished without any loss or corruption of data.

Fortunately, the physical layer protocol of 5G mmW 3GPP may use OFDM modulations which employ guard period also known as cyclic prefix. This guard period may be discarded by the modem as it does not carry any valuable information. As long as the detection followed by the system transition and stabilization is accomplished during this guard period, there will not be any data loss or gain instability. The most stringent requirement may occur for OFDM sub carrier spacing of 120 KHz, where the cyclic prefix is about 580 nanoseconds.

From RF circuitry perspective this may provide enough time for both peak power detection, transition command and RF stabilization to be accomplished. By securing all the registers required for transition and providing a hard wire trigger, the transition command (e.g. implemented by a fast digital command) can be accomplished in just a few tens of nanoseconds. A transition timing diagram is depicted in FIG. 4, demonstrating two repeater transitions, the first from UEs→gNB to sensing state and the second from sensing state gNB→UEs.

In the following, an implementation of the decision logic 203 is described in detail. A decision logic 203 of an RF repeater circuitry, e.g. of an RF repeater 200 shown in FIG. 2, may be configured to: set the receiver to receive a radio signal from the at least one UE and set the transmitter to transmit a radio signal to the base station upon detecting a radio signal reception from the at least one UE, and set the receiver to receive a radio signal from the base station and set the transmitter to transmit a radio signal to the at least one UE upon detecting a radio signal reception from the base station, e.g. in the scenario shown in FIG. 1.

In an exemplary implementation, the decision logic 203 may be configured to: operate in a first state 301 in which the receiver is set to receive a radio signal from the base station and the transmitter is set to transmit a radio signal to the at least one UE, when a power of a radio signal received from the at least one UE is below a first detection threshold T1 and a power of a radio signal received from the base station is above a second detection threshold T2 (e.g. based on transition 311), and operate in a second state 302 in which the receiver is set to receive a radio signal from the at least one UE and the transmitter is set to transmit a radio signal to the base station, when a power of a radio signal received from the at least one UE is above a third detection threshold T3 and a power of a radio signal received from the base station is below a fourth detection threshold T4 (e.g. based on transition 312) as shown in FIG. 3.

In an exemplary implementation, the decision logic 203 may be configured to: operate in a third state 303 in which the transceiver is set to a dual sensing state, when: in the first state 301 a power of a radio signal received from the base station is below a fifth detection threshold T5 (transition 313); or in the second state 302 a power of a radio signal received from the at least one UE is below a sixth detection threshold T6 (transition 314).

In an exemplary implementation, the decision logic 203 may include a hard wire trigger configured to initiate a transition between the states 311, 312, 313, 314 of the decision logic 203.

In an exemplary implementation, the decision logic 203 may include one or more registers used configured to process the transition 311, 312, 313, 314 between the states 301, 302, 303 of the decision logic, wherein the decision logic may be configured to secure the one or more registers before performing the transition.

Figure 4:
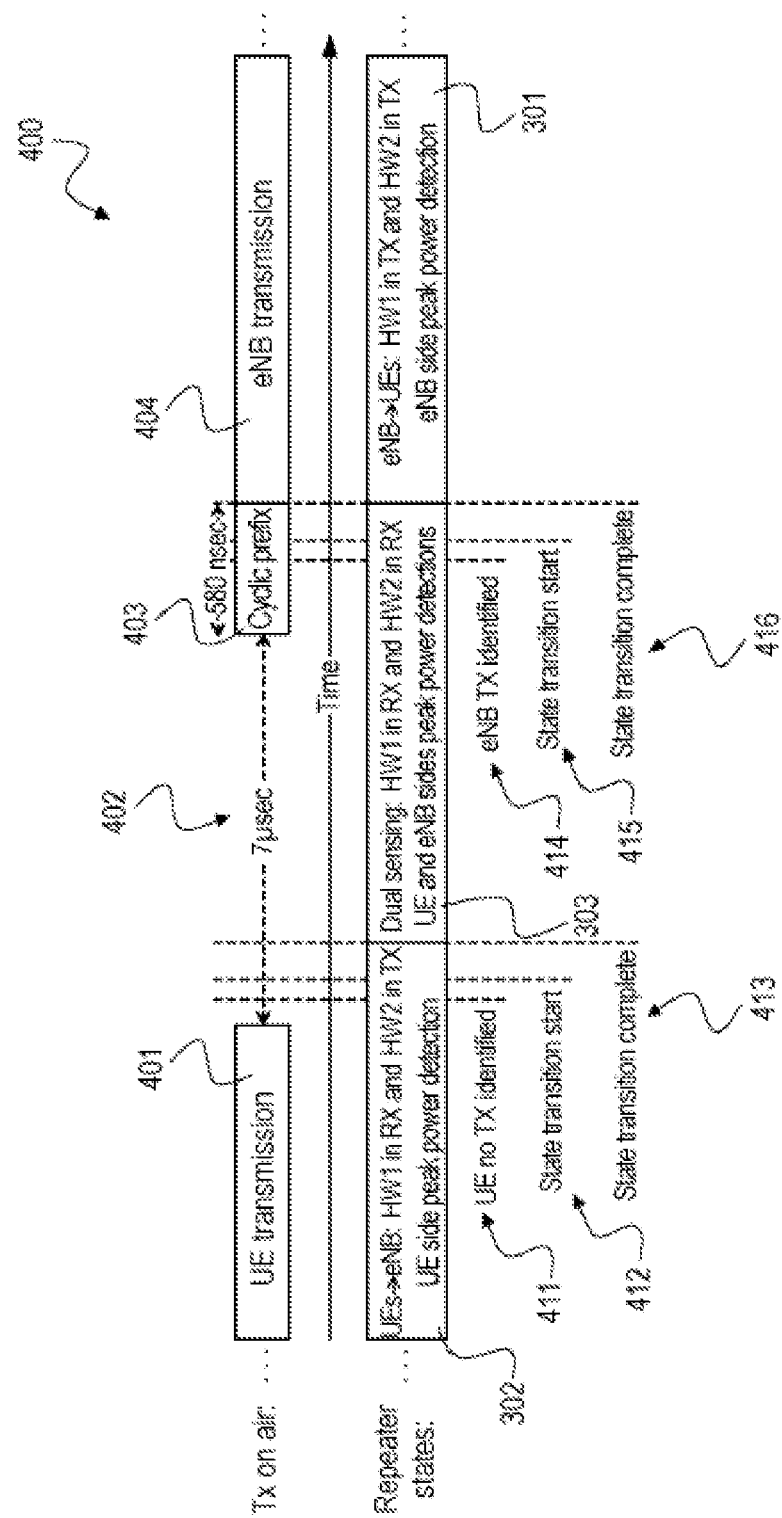
FIG. 4 is a timing diagram 400 illustrating exemplary state transitions of an RF repeater 200 according to the disclosure.

FIG. 4 is a timing diagram 400 illustrating exemplary state transitions of an RF repeater 200 according to the disclosure. The transition timing diagram 400 demonstrates two repeater transitions, the first from UEs→gNB state 302 to sensing state 303 and the second from sensing state 303 to gNB→UEs state 301 according to the description with respect to FIG. 3.

The first transition from UEs→gNB state 302 to sensing state 303 may include the tasks "UE no TX identified" 411, "State transition start" 412 and "State transition complete" 413. In "UE no TX identified" 411 the RF repeater may detect end of UE transmission 401 and may start transition 412 to sensing state 303. When state transition is complete 413, the RF repeater may be in sensing state 303.

In sensing state 303 RF repeater may sense gNB transmission 404 beginning with cyclic prefix 403 and may perform transition from sensing state 303 to gNB→UEs state 301 within the duration of cyclic prefix 403. The second transition from sensing state 303 to gNB→UEs state 301 may include the tasks "gNB TX identified" 414, where transmission of gNB may be detected, "State transition start" 415 and "State transition complete" 416.

When implementing a 5G mmW RF repeater according to 5G specifications, transition time 402 between TX to RX and RX to TX (i.e. second state 302 to first state 301 or vice versa) may be equal to 7.015 microseconds Cyclic prefix (CP) may be calculated to be 1.17 microseconds, 0.58 microseconds and 0.29 microseconds for 60 KHz, 120 KHz and 240 KHz sub-carrier-spacing (SCS), respectively. Currently 240 KHz may be not supported by the industry although it may still appear in a standard.

In FIG. 4, 0.58 microseconds may be used for the cyclic prefix 403 as for now it may be considered as the most stringent (shortest time) requirement to meet. However, in the future there might be a need to support 0.29 microseconds of detection and stabilization time.

Figure 5:
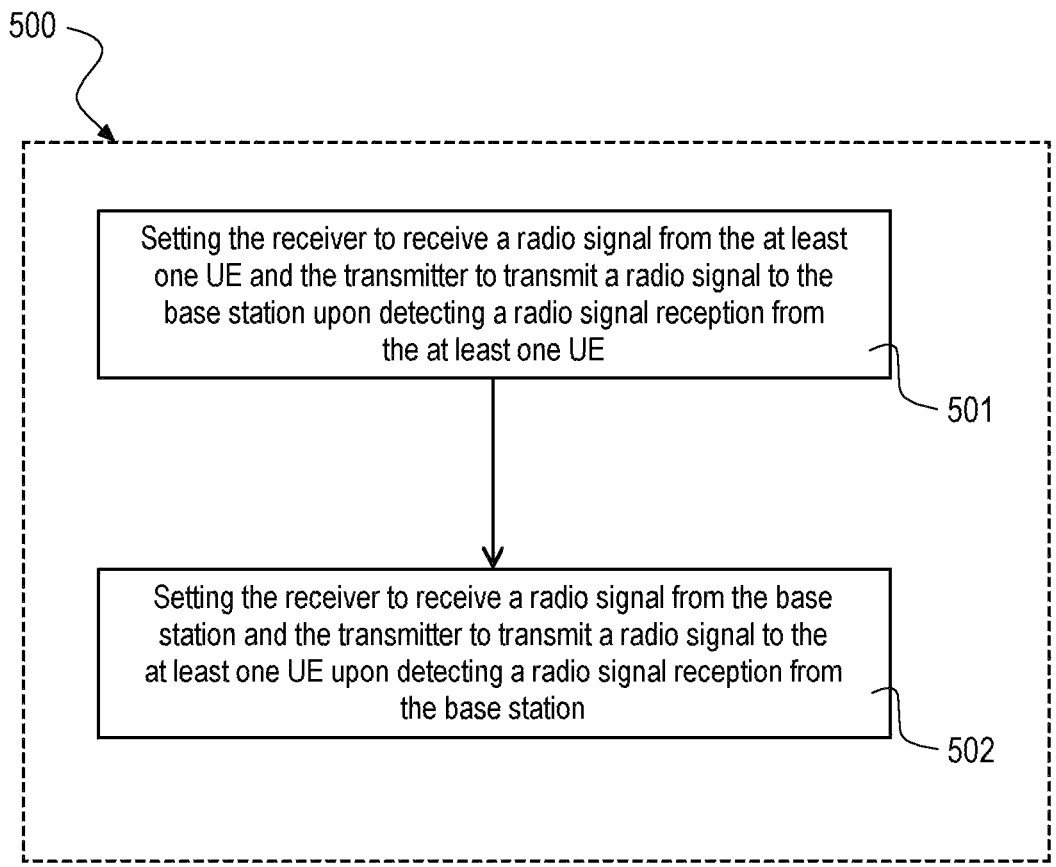
FIG. 5 is a schematic diagram illustrating an exemplary method 500 for repeating signals by an RF repeater 200 according to the disclosure.

FIG. 5 is a schematic diagram illustrating an exemplary method 500 for repeating signals by an RF repeater 200 according to the disclosure.

The method 500 may be designed for repeating signals by an RF repeater, e.g. an RF repeater 200 as described above with respect to FIGS. 2 to 4, including a single transceiver 201, 202 with a receiver for receiving a radio signal from at least one User Equipment, UE, or from a base station, and a transmitter for transmitting a radio signal to the at least one UE or to the base station, e.g. in the scenario as described above with respect to FIG. 1.

The method 500 may include: setting 501 the receiver to receiving a radio signal from the at least one UE and the transmitter to transmit a radio signal to the base station, upon detecting a radio signal reception from the at least one UE, e.g. as described above with respect to FIG. 2; and setting 502 the receiver to receive a radio signal from the base station and the transmitter to transmit a radio signal to the at least one UE, upon detecting a radio signal reception from the base station, e.g. as described above with respect to FIG. 2.

The present disclosure may also support a computer program product including computer executable code or computer executable instructions that, when executed, may cause at least one computer to execute the performing and computing blocks described herein and the methods and procedures described above. Such a computer program product may include a non-transient readable storage medium storing program code thereon for use by a processor, the program code including instructions for performing the methods or the computing blocks as described above.

The following examples pertain to further aspects. Example 1 is a radio frequency, RF, repeater circuitry, including: a single transceiver including a receiver for receiving a radio signal from at least one User Equipment, UE, or from a base station, and a transmitter for transmitting a radio signal to the at least one UE or to the base station; and a decision logic configured to: set the receiver to receive a radio signal from the at least one UE and set the transmitter to transmit a radio signal to the base station upon detecting a radio signal reception from the at least one UE, and set the receiver to receive a radio signal from the base station and set the transmitter to transmit a radio signal to the at least one UE upon detecting a radio signal reception from the base station.

In Example 2, the subject matter of Example 1 can optionally include that the receiver is connected to an antenna port of a first antenna array and the transmitter is connected to an antenna port of a second antenna array; or that the receiver is connected to the antenna port of the second antenna array and the transmitter is connected to the antenna port of the first antenna array.

In Example 3, the subject matter of Example 1 or Example 2 can optionally include that the RF repeater circuitry includes at least two power detectors, wherein: a first power detector is configured to detect a radio signal received from the at least one UE; and a second power detector is configured to detect a radio signal received from the base station.

In Example 4, the subject matter of Example 3 can optionally include that the decision logic is configured to: set the transceiver in a first mode for receiving a radio signal from the at least one UE and for transmitting a radio signal to the base station upon detecting a radio signal reception from the at least one UE, and set the transceiver in a second mode for receiving a radio signal from the base station and for transmitting a radio signal to the at least one UE upon detecting a radio signal reception from the base station.

In Example 5, the subject matter of Example 4 can optionally include that the first power detector is connected between the receiver and the antenna port of the first antenna array or between the receiver and the transmitter; and that the second power detector is connected between the receiver and the antenna port of the second antenna array or between the receiver and the transmitter.

In Example 6, the subject matter of any of Examples 3 to 5 can optionally include that the first power detector and the second power detector are configured to operate independently from each other.

In Example 7, the subject matter of any of Examples 3 to 6 can optionally include that the first power detector is configured to detect a radio signal reception from the at least one UE simultaneously with the second power detector detecting a radio signal reception from the base station.

In Example 8, the subject matter of any of Examples 3 to 7 can optionally include that the RF repeater circuitry is configured to: forward a radio signal received by the receiver in a non-demodulated state to the transmitter upon detecting a radio signal reception from the at least one UE, and forward a radio signal received by the receiver in a non-demodulated state to the transmitter upon detecting a radio signal reception from the base station.

In Example 9, the subject matter of any of Examples 3 to 8 can optionally include that the decision logic is configured to set the transceiver in a dual sensing state upon detecting no radio signal reception from the at least one UE and no radio signal reception from the base station.

In Example 10, the subject matter of any of Examples 3 to 9 can optionally include that the decision logic is configured to operate in a first state in which the receiver is set to receive a radio signal from the base station and the transmitter is set to transmit a radio signal to the at least one UE, when a power of a radio signal detected by the first power detector is below a first detection threshold and a power of a radio signal detected by the second power detector is above a second detection threshold.

In Example 11, the subject matter of Example 10 can optionally include that the decision logic is configured to operate in a second state in which the receiver is set to receive a radio signal from the at least one UE and the transmitter is set to transmit a radio signal to the base station, when a power of a radio signal detected by the first power detector is above a third detection threshold and a power of a radio signal detected by the second power detector is below a fourth detection threshold.

In Example 12, the subject matter of Example 11 can optionally include that the decision logic is configured to operate in a third state in which the transceiver is set to a dual sensing state, when: in the first state of the decision logic a power of a radio signal detected by the second power detector is below a fifth detection threshold; or in the second state of the decision logic a power of a radio signal detected by the first power detector is below a sixth detection threshold.

In Example 13, the subject matter of Example 12 can optionally include that the RF repeater circuitry is configured to perform the detecting of a radio signal and a transition between the states of the decision logic within a guard period or cyclic prefix of the radio signal.

In Example 14, the subject matter of Example 12 or 13 can optionally include that the decision logic includes a hard wire trigger configured to initiate the transition between the states of the decision logic.

In Example 15, the subject matter of Example 13 or 14 can optionally include that the decision logic includes one or more registers configured to process the transition between the states of the decision logic; and that the decision logic is configured to secure the one or more registers before performing the transition.

In Example 16, the subject matter of any of Examples 1 to 15 can optionally include that the RF repeater circuitry is configured to repeat 5G mm Wave radio signals.

Example 17 is a radio frequency, RF, repeater, including: a single transceiver including a receiver for receiving a radio signal from at least one User Equipment, UE, or from a base station, and a transmitter for transmitting a radio signal to the at least one UE or to the base station; at least two power detectors, wherein a first power detector is configured to detect a radio signal reception from the at least one UE; and a second power detector is configured to detect a radio signal reception from the base station; and a decision logic configured to: set the receiver to receive a radio signal from the at least one UE and set the transmitter to transmit a radio signal to the base station upon detecting by the first power detector a radio signal reception from the at least one UE, and set the receiver to receive a radio signal from the base station and set the transmitter to transmit a radio signal to the at least one UE upon detecting by the second power detector a radio signal reception from the base station.

In Example 18, the subject matter of Example 17 can optionally include that the RF repeater includes: a first antenna port of a first antenna array; and a second antenna port of a second antenna array, wherein the receiver is connected to the first antenna port of the first antenna array and the transmitter is connected to the second antenna port of the second antenna array; or wherein the receiver is connected to the second antenna port of the second antenna array and the transmitter is connected to the first antenna port of the first antenna.

In Example 19, the subject matter of Example 17 or 18 can optionally include that the decision logic is configured to: set the transceiver in a first mode for receiving a radio signal from the at least one UE and for transmitting a radio signal to the base station upon detecting a radio signal reception from the at least one UE, and set the transceiver in a second mode for receiving a radio signal from the base station and for transmitting a radio signal to the at least one UE upon detecting a radio signal reception from the base station.

In Example 20, the subject matter of Example 19 can optionally include that the first power detector is connected between the receiver and the first antenna port of the first antenna array or between the receiver and the transmitter; and the second power detector is connected between the receiver and the second antenna port of the second antenna array or between the receiver and the transmitter.

In Example 21, the subject matter of any of Examples 17 to 20 can optionally include that the RF repeater includes: a third power detector configured to detect a radio signal reception from the at least one UE; and a fourth power detector configured to detect a radio signal reception from the base station, wherein the first power detector and the third power detector are arranged at different positions towards the transceiver, and wherein the second power detector and the fourth power detector are arranged at different positions towards the transceiver.

In Example 22, the subject matter of Example 21 can optionally include that the first power detector and the third power detector are configured to provide a joint detection result for a radio signal reception from the at least one UE; and that the second power detector and the fourth power detector are configured to provide a joint detection result for a radio signal reception from the base station.

In Example 23, the subject matter of any of Examples 17 to 22 can optionally include that the first power detector and the second power detector are configured to operate independently from each other.

In Example 24, the subject matter of any of Examples 17 to 23 can optionally include that the first power detector is configured to detect a radio signal reception from the at least one UE simultaneously with the second power detector detecting a radio signal reception from the base station.

In Example 25, the subject matter of any of Examples 17 to 24 can optionally include that the RF repeater is configured to: forward a radio signal received by the receiver in a non-demodulated state to the transmitter upon detecting a radio signal reception from the at least one UE, and forward a radio signal received by the receiver in a non-demodulated state to the transmitter upon detecting a radio signal reception from the base station.

In Example 26, the subject matter of any of Examples 17 to 25 can optionally include that the decision logic is configured to: set the transceiver to a dual sensing state upon detecting no radio signal reception from the at least one UE by the first power detector and upon detecting no radio signal reception from the base station by the second power detector.

In Example 27, the subject matter of any of Examples 17 to 26 can optionally include that the decision logic is configured to operate in a first state in which the receiver is set to receive a radio signal from the base station and the transmitter is set to transmit a radio signal to the at least one UE, when a power of a radio signal detected by the first power detector is below a first detection threshold and a power of a radio signal detected by the second power detector is above a second detection threshold.

In Example 28, the subject matter of Example 27 can optionally include that the decision logic is configured to operate in a second state in which the receiver is set to receive a radio signal from the at least one UE and the transmitter is set to transmit a radio signal to the base station, when a power of a radio signal detected by the first power detector is above a third detection threshold and a power of a radio signal detected by the second power detector is below a fourth detection threshold.

In Example 29, the subject matter of Example 28 can optionally include that the decision logic is configured to operate in a third state in which the transceiver is set to a dual sensing state, when: in the first state of the decision logic a power of a radio signal detected by the second power detector is below a fifth detection threshold; or in the second state of the decision logic a power of a radio signal detected by the first power detector is below a sixth detection threshold.

In Example 30, the subject matter of Example 29 can optionally include that the RF repeater is configured to perform the detecting of a radio signal and a transition between the states of the decision logic within a guard period or cyclic prefix of the radio signal.

In Example 31, the subject matter of Example 29 or 30 can optionally include that the decision logic includes a hard wire trigger configured to initiate the transition between the states of the decision logic.

In Example 32, the subject matter of any of Examples 29 to 31 can optionally include that the decision logic includes one or more registers configured to process the transition between the states of the decision logic; and that the decision logic is configured to secure the one or more registers before performing the transition.

In Example 33, the subject matter of any of Examples 17 to 32 can optionally include that the RF repeater is configured to repeat 5G mm Wave radio signals.

Example 34 is a decision logic of a radio frequency, RF, repeater circuitry, including: a single transceiver including a receiver for receiving a radio signal from at least one User Equipment, UE, or from a base station, and a transmitter for transmitting a radio signal to the at least one UE or to the base station; wherein the decision logic is configured to: set the receiver to receive a radio signal from the at least one UE and set the transmitter to transmit a radio signal to the base station upon detecting a radio signal reception from the at least one UE, and set the receiver to receive a radio signal from the base station and set the transmitter to transmit a radio signal to the at least one UE upon detecting a radio signal reception from the base station.

In Example 35, the subject matter of Example 34 can optionally include that the decision logic is configured to: operate in a first state in which the receiver is set to receive a radio signal from the base station and the transmitter is set to transmit a radio signal to the at least one UE, when a power of a radio signal received from the at least one UE is below a first detection threshold and a power of a radio signal received from the base station is above a second detection threshold, and operate in a second state in which the receiver is set to receive a radio signal from the at least one UE and the transmitter is set to transmit a radio signal to the base station, when a power of a radio signal received from the at least one UE is above a third detection threshold and a power of a radio signal received from the base station is below a fourth detection threshold.

In Example 36, the subject matter of Example 35 can optionally include that the decision logic is configured to: operate in a third state in which the transceiver is set to a dual sensing state, when: in the first state a power of a radio signal received from the base station is below a fifth detection threshold; or in the second state a power of a radio signal received from the at least one UE is below a sixth detection threshold.

In Example 37, the subject matter of any of Examples 35 to 36 can optionally include that the decision logic includes a hard wire trigger configured to initiate a transition between the states of the decision logic.

In Example 38, the subject matter of any of Examples 35 to 37 can optionally include that the decision logic includes one or more registers used to process the transition between the states of the decision logic, wherein the decision logic is configured to secure the one or more registers before performing the transition.

Example 39 is a method for repeating signals by a radio frequency, RF, repeater, the RF repeater including a single transceiver including a receiver for receiving a radio signal from at least one User Equipment, UE, or from a base station, and a transmitter for transmitting a radio signal to the at least one UE or to the base station, wherein the method includes: setting the receiver to receiving a radio signal from the at least one UE and the transmitter to transmit a radio signal to the base station, upon detecting a radio signal reception from the at least one UE; and setting the receiver to receive a radio signal from the base station and the transmitter to transmit a radio signal to the at least one UE, upon detecting a radio signal reception from the base station.

In Example 40, the subject matter of Example 39 can optionally include that the method includes: detecting a radio signal received from the at least one UE by a first power detector; and detecting a radio signal received from the base station by a second power detector.

In Example 41, the subject matter of Example 40 can optionally include that the method includes detecting a radio signal received from the at least one UE by the first power detector independently from detecting a radio signal received from the base station by the second first power detector.

In Example 42, the subject matter of Example 40 or 41 can optionally include that the method includes detecting a radio signal received from the at least one UE by the first power detector simultaneously with detecting a radio signal received from the base station by the second power detector.

In Example 43, the subject matter of any of Examples 39 to 42 can optionally include that the method includes: forwarding a radio signal received by the receiver in a non-demodulated state to the transmitter upon detecting a radio signal reception from the at least one UE, and forwarding a radio signal received by the receiver in a non-demodulated state to the transmitter upon detecting a radio signal reception from the base station.

In Example 44, the subject matter of any of Examples 39 to 43 can optionally include that the method includes setting the transceiver to a dual sensing state upon detecting no radio signal reception from the at least one UE and no radio signal reception from the base station.

In Example 45, the subject matter of Example 40 can optionally include that the method includes operating in a first state in which the receiver is set to receive a radio signal from the base station and the transmitter is set to transmit a radio signal to the at least one UE, when a power of a radio signal detected by the first power detector is below a first detection threshold and a power of a radio signal detected by the second power detector is above a second detection threshold.

In Example 46, the subject matter of Example 45 can optionally include that the method includes operating in a second state in which the receiver is set to receive a radio signal from the at least one UE and the transmitter is set to transmit a radio signal to the base station, when a power of a radio signal detected by the first power detector is above a third detection threshold and a power of a radio signal detected by the second power detector is below a fourth detection threshold.

In Example 47, the subject matter of Example 46 can optionally include that the method includes changing to a third state in which the transceiver is set to a dual sensing state, when: in the first state a power of a radio signal detected by the second power detector is below a fifth detection threshold; or in the second state a power of a radio signal detected by the first power detector is below a sixth detection threshold.

In Example 48, the subject matter of Example 46 or 47 can optionally include that the method includes performing the detecting of a radio signal and transition between the states within a guard period or cyclic prefix of the radio signal.

In Example 49, the subject matter of any of Examples 46 to 48 can optionally include that the method includes initiating the transition between the states of the decision logic by a hard wire trigger.

In Example 50, the subject matter of any of Examples 46 to 49 can optionally include that the method includes processing the transition between the states by using one or more registers; and securing the one or more registers before performing the transition.

In Example 51, the subject matter of any of Examples 39 to 50 can optionally include that the method includes repeating 5G mm Wave radio signals.

Example 52 is a device for repeating signals by a radio frequency, RF, repeater, the RF repeater including a single transceiver including a receiver for receiving a radio signal from at least one User Equipment, UE, or from a base station, and a transmitter for transmitting a radio signal to the at least one UE or to the base station, wherein the device includes: means for setting the receiver to receive a radio signal from the at least one UE and the transmitter to transmit a radio signal to the base station, upon detecting a radio signal reception from the at least one UE; and means for setting the receiver to receive a radio signal from the base station and the transmitter to transmit a radio signal to the at least one UE, upon detecting a radio signal reception from the base station.

In Example 53, the subject matter of Example 52 can optionally include that the device includes means for detecting a radio signal received from the at least one UE; and means for detecting a radio signal received from the base station.

Example 54 is a computer readable non-transitory medium on which computer instructions are stored which when executed by a computer cause the computer to perform the method of any one of Examples 39 to 51.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the concept of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A radio frequency (RF) repeater circuitry, comprising:
   a single transceiver comprising a receiver for receiving radio signals from at least one User Equipment (UE) or from a base station, and a transmitter for transmitting radio signals to the at least one UE or to the base station;
   a first power detector configured to detect radio signals received from the at least one UE and a second power detector configured to detect radio signals received from the base station; and
   a decision logic circuit configured to:
   operate in a first state in which the receiver is set to receive a radio signal from the at least one UE and the transmitter is set to transmit a radio signal to the base station upon detecting that a first power of radio signal reception from the at least one UE detected at the first power detector is above a first threshold and detecting that a second power of radio signal reception from the base station detected at the second power detector is below a second threshold; and
   operate in a second state in which the receiver is set to receive a radio signal from the base station and the transmitter is set to transmit a radio signal to the at least one UE upon detecting that the first power of radio signal reception from the base station detected at the second power detector is above a third threshold and detecting that the second power of radio signal reception from the at least one UE at the first power detector is below a fourth threshold.

2. The RF repeater circuitry of claim 1, wherein:
   the receiver is connected to an antenna port of a first antenna array and the transmitter is connected to an antenna port of a second antenna array; or the receiver is connected to the antenna port of the second antenna array and the transmitter is connected to the antenna port of the first antenna array.

3. The RF repeater circuitry of claim 2, wherein:
the first power detector is connected between the receiver and an antenna port of the first antenna array or between the receiver and the transmitter; and
the second power detector is connected between the receiver and the antenna port of the second antenna array or between the receiver and the transmitter.

4. The RF repeater circuitry of claim 1, wherein the first power detector and the second power detector are configured to operate independently from each other.

5. The RF repeater circuitry of claim 1, configured to:
forward a radio signal received by the receiver in a non-demodulated state to the transmitter upon detecting the radio signal reception from the at least one UE; and
forward a radio signal received by the receiver in a non-demodulated state to the transmitter upon detecting the radio signal reception from the base station.

6. The RF repeater circuitry of claim 1, wherein the decision logic circuit is configured to set the transceiver in a dual sensing state upon detecting no radio signal reception from the at least one UE and no radio signal reception from the base station.

7. The RF repeater circuitry of claim 1, wherein the decision logic circuit is configured to operate in a third state in which the transceiver is set to a dual sensing state, based on:
in the first state of the decision logic circuit, the first power of radio signal reception detected by the first power detector falling below a fifth detection threshold; or
in the second state of the decision logic circuit, the second power of radio signal reception detected by the second power detector falling below a sixth detection threshold.

8. The RF repeater circuitry of claim 1, configured to perform the detecting of a radio signal and a transition between the states of the decision logic circuit within a guard period or cyclic prefix of the radio signal.

9. A decision logic circuit for a radio frequency (RF) repeater with a single transceiver comprising a receiver and a transmitter, the decision logic circuit configured to:
operate in a first state in which the receiver is set to receive a radio signal from at least one user equipment (UE) and the transmitter is set to transmit a radio signal to a base station upon detecting that a first power of radio signal reception from the at least one UE detected at a first power detector is above a first threshold and detecting that a second power of radio signal reception from the base station detected at a second power detector is below a second threshold; and
operate in a second state in which the receiver is set to receive a radio signal from the base station and the transmitter is set to transmit a radio signal to the at least one UE upon detecting that the first power of radio signal reception from the base station detected at the second power detector is above a third threshold and detecting that the second power of radio signal reception from the at least one UE detected at the first power detector is below a fourth threshold.

10. The decision logic circuit of claim 9, further configured to operate in a third state in which the transceiver is set to a dual sensing state, based on:
in the first state of the decision logic circuit, the first power of radio signal reception detected by the first power detector falling below a fifth detection threshold; or
in the second state of the decision logic circuit, the second power of radio signal reception detected by the second power detector falling below a sixth detection threshold.

11. The decision logic circuit of claim 9, wherein the decision logic circuit is configured to set the transceiver in a dual sensing state upon detecting no radio signal reception from the at least one UE and no radio signal reception from the base station.

12. A method for repeating signals by a radio frequency (RF) repeater, the RF repeater comprising a single transceiver comprising a receiver for receiving a radio signal from at least one User Equipment (UE) or from a base station, and a transmitter for transmitting a radio signal to the at least one UE or to the base station, wherein the method comprises switching between:
setting the receiver to receive a radio signal from the at least one UE and setting the transmitter to transmit a radio signal to the base station upon detecting that a first power of radio signal reception from the at least one UE is above a first threshold and detecting that a second power of radio signal reception from the base station is below a second threshold; and
setting the receiver to receive a radio signal from the base station and setting the transmitter to transmit a radio signal to the at least one UE upon detecting that the first power of radio signal reception from the base station is above a third threshold and detecting that the second power of radio signal reception from the at least one UE is below a fourth threshold.

13. The method of claim 12, further comprising:
detecting the first power of the radio signal reception received from the at least one UE by a first power detector; and
detecting the second power of the radio signal reception received from the base station by a second power detector.

14. The method of claim 12, the method further comprising switching between:
setting the transceiver to operate in a dual sensing state upon detecting no radio signal reception from the at least one UE and no radio signal reception from the base station.

15. The method of claim 12, the method further comprising switching between:
setting the transceiver to operate in a dual sensing state based on:
detecting that the first power of radio signal reception is below a fifth detection threshold when the receiver is set to receive the radio signal from the at least one UE and the transmitter is set to transmit the radio signal to the base station; or
detecting that the second power of radio signal reception is below a sixth detection threshold when the receiver is set to receive the radio signal from the at base station and the transmitter is set to transmit the radio signal to the at least one UE.

* * * * *